US010565982B2

(12) United States Patent
Dolph et al.

(10) Patent No.: US 10,565,982 B2
(45) Date of Patent: Feb. 18, 2020

(54) TRAINING DATA OPTIMIZATION IN A SERVICE COMPUTING SYSTEM FOR VOICE ENABLEMENT OF APPLICATIONS

(71) Applicant: International Business Machines Corporation, Armonk, NY (US)

(72) Inventors: Blaine H. Dolph, Western Springs, IL (US); David M. Lubensky, Brookfield, CT (US); Mal Pattiarachi, New York, NY (US); Marcus D. Roy, Chicago, IL (US); Justin Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/808,169

(22) Filed: Nov. 9, 2017

(65) Prior Publication Data
US 2019/0138270 A1 May 9, 2019

(51) Int. Cl.
G10L 15/01 (2013.01)
G10L 15/06 (2013.01)
G06F 3/16 (2006.01)
G10L 13/04 (2013.01)
(Continued)

(52) U.S. Cl.
CPC ............ G10L 15/063 (2013.01); G06F 3/167 (2013.01); G06N 20/00 (2019.01); G10L 13/043 (2013.01); G10L 15/265 (2013.01)

(58) Field of Classification Search
CPC .................................. G10L 15/01; G06F 17/27
See application file for complete search history.

(56) References Cited

U.S. PATENT DOCUMENTS

| 6,141,642 A | 10/2000 | Chang-hwan |
| 6,622,121 B1 * | 9/2003 | Crepy ..................... G10L 15/01 704/243 |
| 6,963,841 B2 | 11/2005 | Wilson et al. |

(Continued)

FOREIGN PATENT DOCUMENTS

| JP | 2004145015 | 5/2004 |
| WO | 2007129 A1 | 11/2007 |

OTHER PUBLICATIONS

List of IBM Patents or Patent Applications Treated as Related, dated herewith.

*Primary Examiner* — Douglas Godbold
(74) *Attorney, Agent, or Firm* — ZIP Group PLLC

(57) ABSTRACT

Techniques for optimizing training data within voice user interface (VUI) of an application under development are disclosed. A VUI feedback module synthesizes human speech of a training phrase. This phrase is presented upon a speaker which is simultaneously captured upon a microphone. A speech to text framework converts the synthesized training phrase into text (textualized training phrase). The VUI feedback module compares the textualized training phrase to the actual training phrase and generates a speech training data structure that identifies similarities or dissimilarities between the textualized training phrase and the actual training phrase. This data structure may be utilized by an application developer computing system to identify training data that is most venerable to misinterpretation when a user interacts with the VUI. The VUI may subsequently be adjusted to account for the vulnerabilities to improve operations or user experience of the VUI.

14 Claims, 10 Drawing Sheets

(51) Int. Cl.
*G10L 15/26* (2006.01)
*G06N 20/00* (2019.01)

(56) References Cited

U.S. PATENT DOCUMENTS

| | | |
|---|---|---|
| 7,383,182 B2 | 6/2008 | Taylor et al. |
| 8,069,030 B2 | 11/2011 | Iso-sipilä et al. |
| 8,165,887 B2 | 4/2012 | Tremblay |
| 8,595,004 B2 | 11/2013 | Koshinaka et al. |
| 9,311,913 B2 | 4/2016 | Legat |
| 9,368,104 B2 | 6/2016 | Eller et al. |
| 10,049,676 B2 | 8/2018 | Yeracaris et al. |
| 2003/0236672 A1* | 12/2003 | Aaron .................... G10L 15/01 704/277 |
| 2005/0086055 A1* | 4/2005 | Sakai ..................... G10L 15/01 704/231 |
| 2005/0131676 A1* | 6/2005 | Ghasemi ................ G10L 15/01 704/201 |
| 2006/0085187 A1* | 4/2006 | Barquilla ............... G10L 13/08 704/243 |
| 2008/0312918 A1* | 12/2008 | Kim ....................... G10L 15/01 704/233 |
| 2009/0271189 A1* | 10/2009 | Agapi .................... G10L 15/01 704/233 |
| 2015/0058019 A1 | 2/2015 | Chen |
| 2016/0049144 A1 | 2/2016 | Conkie et al. |
| 2016/0179831 A1 | 6/2016 | Gruber et al. |
| 2016/0240215 A1 | 8/2016 | Suess et al. |
| 2017/0004823 A1* | 1/2017 | Fukuda .................. G10L 15/01 |
| 2018/0151177 A1 | 5/2018 | Gemmeke et al. |

\* cited by examiner

450

| Accuracy Score | Training Phrase | Textualized Training Phrase | Speaker Voice | Language | Region | Dialect | Acoustic Setting | Volume Setting |
|---|---|---|---|---|---|---|---|---|
| 100 | What is the weather in Denver Colorado | What is the weather in Denver Colorado | Male, Middle Age | English | American | General American | Background, Mall | Voice low, Background high |
| 100 | What is the weather in Boulder Colorado | What is the weather in Boulder Colorado | Female, Elderly | English | American | Eastern New England | Location, Warehouse | Voice high |
| 100 | What is the weather in Aspen Colorado | What is the weather in Aspen Colorado | Female, Young | English | American | Midland | Distortion, Network Congestion | Voice high |
| 60 | What is the weather in Littleton Colorado | What is the weather in Golden Colorado | Female, Middle Age | English | Canada | Standard Canadian | Distortion, Cell Tower Handoff | Voice low |
| 40 | What is the weather in Ouray Colorado | What is the weather in Telluride Colorado | Male, Young | English | UK | Northern | Distortion, Low Microphone Level | Voice high |

| Error Score | User Intent | Training Phrase | Textualized Training Phrase | Speaker Voice | Language | Acoustic Setting | Volume Setting |
|---|---|---|---|---|---|---|---|
| 90 | Start job | Clock in for my job | Clock information Bob | Male, Young | English | Background, City | Voice high, Background high |
| 80 | Start job | Clock in for my job | Clock information | Male, Young | English | Background, City | Voice high, Background high |
| 60 | Start job | Kickoff the task | Take off the rack | Female, Middle Age | English | Background Noise Filtered | Voice high, Background high |
| 30 | Start job | Start the task | Start the rack | Female, Young | English | Background, City | Voice low, Background high |
| 0 | Start job | Start the job | Start the job | Female, Elderly | English | Background, Beach | Voice low, Background high |
| 0 | Start job | Begin job | Begin job | Male, Middle Age | English | Background Noise Filtered | Voice low, Background high |

FIG. 10

TRAINING DATA OPTIMIZATION IN A SERVICE COMPUTING SYSTEM FOR VOICE ENABLEMENT OF APPLICATIONS

BACKGROUND

Embodiments presented herein are related to electronic devices, and more specifically, to optimizing training data within a voice user interface (VUI) of an electronic device application.

A VUI makes user interaction with the electronic device possible by using voice/speech. In general, the more complex the user's speech interactions, the more challenging it is for the VUI to recognize those speech interactions. On the other hand, a VUI may be beneficial for handling quick and routine user interactions with the electronic device.

Some electronic devices, such as mobile electronic devices, are ripe for speech based interfaces due to the typically small display size. In such devices, challenges exist both in providing input (e.g. via small virtual keyboards) and output (e.g. must tap/swipe/pinch to scroll through content). Additionally, speech can provide a hands-free mechanism to interact with the GUI of an application which can be useful for the user.

SUMMARY

In an embodiment of the present invention, a method is presented. The method includes receiving, with a service computing system from an application developer computing system, voice user interface (VUI) training data of an application that is under development within the application developer computing system. The method further includes generating an audio output comprising synthesized human speech of a training phrase within the VUI training data. The method further includes audibly presenting the audio output upon a speaker of the service computing system and simultaneously capturing the synthesized human speech of the training phrase with a microphone of the service computing system. The method further includes converting the captured synthesized human speech of the training phrase into text (textualized training phrase) with a selected speech to text framework. The method further includes comparing text of the training phrase with the textualized training phrase. The method further includes scoring the textualized training phrase based upon similarity of the textualized training phrase to the text of the training phrase. The method further includes generating an output training data score data structure comprising the score of the textualized training phrase, the text of the training phrase, and the text of the textualized training phrase, the output training data score data structure ranking those training phrases within the VUI training data that are most misunderstood by the selected speech to text framework to those training phrases within the VUI training data that are accurately understood by the selected speech to text framework. The method further includes sending the output training data score data structure to the application developer computing system.

In another embodiment of the present invention, a computer program product is claimed. The computer program product includes a first computer readable storage medium having first program instructions embodied therewith. The first program instructions are readable by a service computing system to cause the service computing system to receive, from an application developer computing system, voice user interface (VUI) training data of an application that is under development within the application developer computing system. The first program instructions are readable by a service computing system to cause the service computing system to generate an audio output comprising synthesized human speech of a training phrase within the VUI training data and audibly present the audio output upon a speaker of the service computing system and simultaneously capturing the synthesized human speech of the training phrase with a microphone of the service computing system. The first program instructions are readable by a service computing system to cause the service computing system to convert the captured synthesized human speech of the training phrase into text (textualized training phrase) with a selected speech to text framework, compare text of the training phrase with the textualized training phrase, and score the textualized training phrase based upon similarity of the textualized training phrase to the text of the training phrase. The first program instructions are readable by a service computing system to cause the service computing system to generate an output training data score data structure comprising the score of the textualized training phrase, the text of the training phrase, and the text of the textualized training phrase, the output training data score data structure ranking those training phrases within the VUI training data that are most misunderstood by the selected speech to text framework to those training phrases within the VUI training data that are accurately understood by the selected speech to text framework. The first program instructions are readable by a service computing system to cause the service computing system to send the output training data score data structure to the application developer computing system.

A service computing system comprising a first processor and a first memory, the first memory comprising first program instructions embodied therewith that are readable by the first processor to cause the first processor to receive, from an application developer computing system, voice user interface (VUI) training data of an application that is under development within the application developer computing system. The first program are further readable by the first processor to cause the first processor to generate an audio output comprising synthesized human speech of a training phrase within the VUI training data and audibly present the audio output upon a speaker of the service computing system and simultaneously capturing the synthesized human speech of the training phrase with a microphone of the service computing system. The first program are further readable by the first processor to cause the first processor to convert the captured synthesized human speech of the training phrase into text (textualized training phrase) with a selected speech to text framework, compare text of the training phrase with the textualized training phrase, and score the textualized training phrase based upon similarity of the textualized training phrase to the text of the training phrase. The first program are further readable by the first processor to cause the first processor to generate an output training data score data structure comprising the score of the textualized training phrase, the text of the training phrase, and the text of the textualized training phrase, the output training data score data structure ranking those training phrases within the VUI training data that are most misunderstood by the selected speech to text framework to those training phrases within the VUI training data that are accurately understood by the selected speech to text framework. The first program are further readable by the first processor to cause the first processor to send the output training data score data structure to the application developer computing system.

BRIEF DESCRIPTION OF THE SEVERAL VIEWS OF THE DRAWINGS

FIG. 9 and FIG. 10 illustrate exemplary speech training data structures, according to one or more embodiments.

DETAILED DESCRIPTION

Embodiments presented herein disclose techniques for optimizing training data within VUI of an application that is under development or otherwise being created. Training data is words, phrases, sentences, or the like that define user intents that when conveyed to and understood by the VUI begins or continues a workflow of the associated application. When the VUI of the electronic device application is utilized by a user, accuracy of converting the user's speech to a language understood by the application generally depends upon the veracity of the speech to text framework of the application and upon the complexity, accent, volume, etc., of the user's speech.

The VUI feedback module may synthesize audio speech outputs of training data, simultaneously sense the synthesized audio speech outputs, and feed the sensed synthesized audio speech outputs into a selected speech to text framework. The speech to text framework converts the spoken training data within the synthesized audio speech outputs into text (textualized training data). Audio variables may be integrated into the synthesized audio speech output to simulate differences in user speech voices, accents, volume, background noise, distortions, or the like.

The VUI feedback module may compare the textualized training data to the actual training data and may generate a speech training data structure that identifies the accuracy of the selected speech to text framework in converting the training data within the synthesized audio speech output to textualized training data. The speech training data structure may be utilized by the application developer computing system to identify the training data that is most venerable to misinterpretation when a user interacts with the VUI. As such, the VUI of the application under development may subsequently be adjusted to account for the identified vulnerabilities so as to improve the operation of the electronic device evoking the VUI application and/or user experience of interacting with the VUI.

Figure 1:
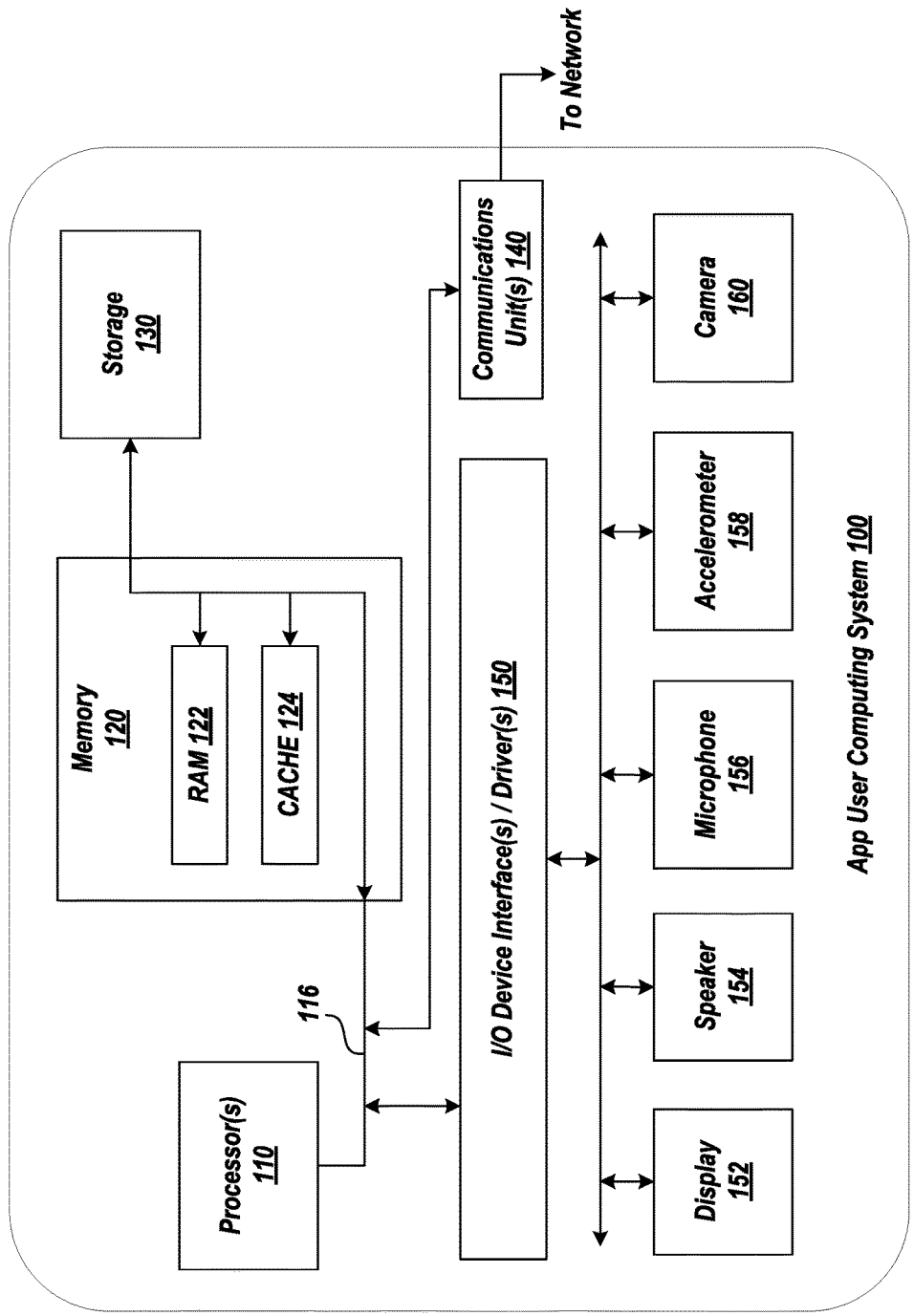
FIG. 1 illustrates an exemplary application user computing system, according to one or more embodiments.

FIG. 1 illustrates an exemplary application user computing system 100. Many modifications to the depicted features of the exemplary application user computing system 100 may be made within the scope of the invention.

Application user computing system 100 is a computer, such as a handheld portable electronic device, and includes a bus 116, which provides communications between at least processor(s) 110, memory 120, persistent storage 130, communications unit 140, and input/output (I/O) interface(s)/driver(s) 150. Memory 120 and persistent storage 130 are examples of a computer readable storage device. A storage device is any piece of hardware that is capable of storing information, such as, data, program code in functional form, and/or other suitable information on a temporary basis and/or permanent basis. Memory 120 may be, for example, one or more random access memories (RAM) 122, cache memory 124, or any other suitable non-volatile or volatile storage device.

An application that includes a VUI is stored in persistent storage 130 for execution by one or more of the respective processors 110 via memory 120. In the embodiment illustrated in FIG. 1, persistent storage 130 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

The storage media used by persistent storage 130 may also be removable. For example, a removable hard drive may be used for persistent storage 130. Other examples include an optical or magnetic disk that is inserted into a drive for transfer onto another storage device that is also a part of persistent storage 130, or other removable storage devices such as a thumb drive or smart card.

Communications unit(s) 140 provides for communications with other data processing systems or devices. Communications unit(s) 140 may include one or more network interface cards and may provide communications through the use of either or both physical and wireless communications links. In other embodiments, application user computing system 100 may be devoid of communications unit 410. The Application may be downloaded to persistent storage 130 through communications unit(s) 140.

I/O device interface(s)/driver(s) 150 allows for input and output of data with other components within application user computing system 100. For example, I/O device interface(s)/driver(s) 150 may provide a connection to display 152, a speaker 154, microphone 156, accelerometer 158, camera 160, and/or some other suitable input/output device. Display 152 provides a hardware mechanism, such as a screen, to display e.g., a graphical user interface to a user and may be, for example, a touch screen, or the like.

Figure 2:
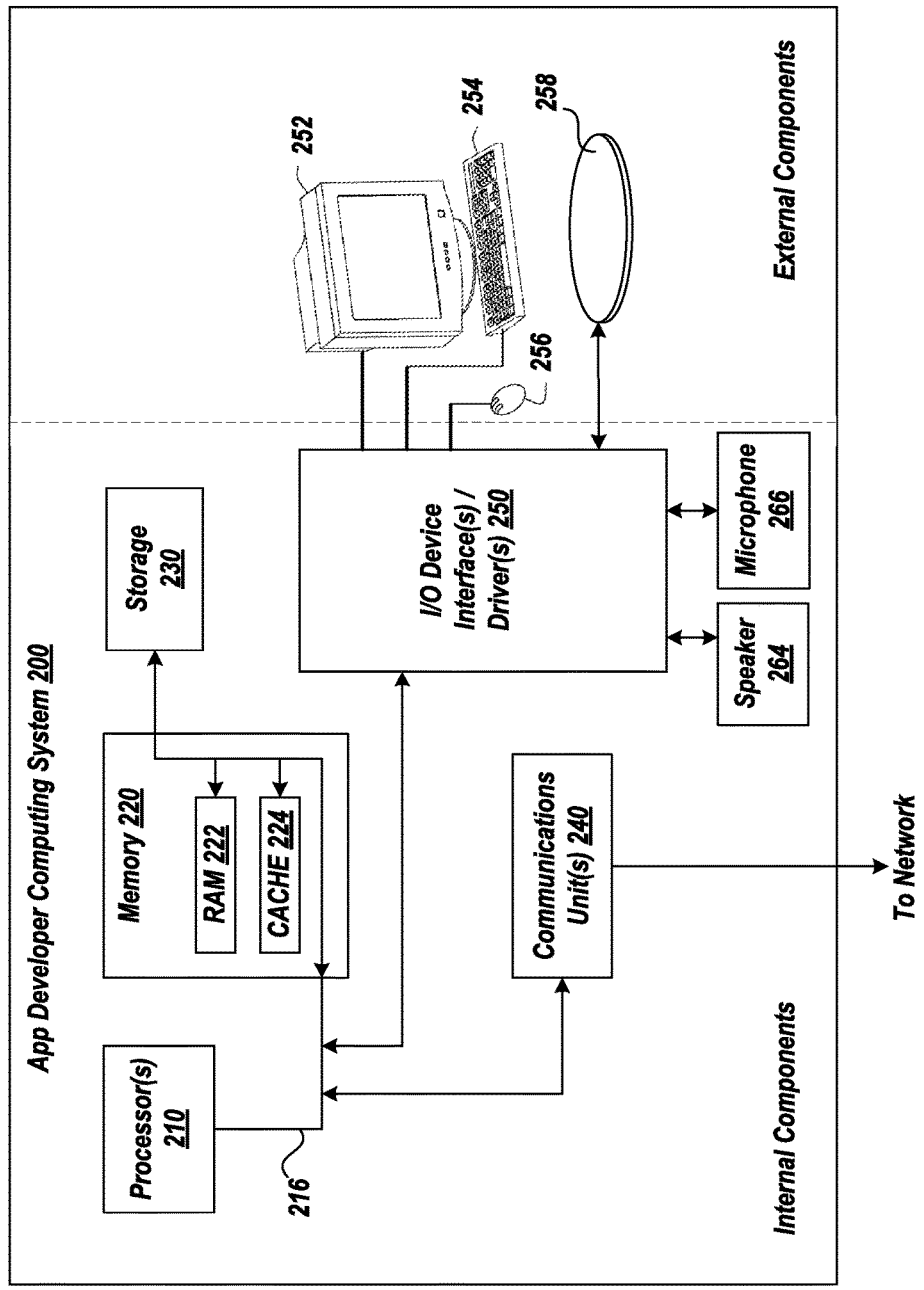
FIG. 2 illustrates an exemplary application developer computing system, according to one or more embodiments.

FIG. 2 illustrates an exemplary application developer computing system 200. Application developer computing system 200 may include respective sets of internal components and external components. Each of the sets of internal components includes bus 216, which provides communications between at least processor(s) 210, memory 220, persistent storage 230, communications unit(s) 240, and input/output (I/O) interface(s)/driver(s) 250. Memory 220 and persistent storage 230 are examples of computer readable storage devices. Memory 220 may be, for example, one or more random access memories (RAM) 222, cache memory 224, or any other suitable non-volatile or volatile storage device.

An application that contains a VUI is developed within application developer computing system 200. Persistent storage 230 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

Communications unit(s) 240 provides for communications with other data processing systems or devices. Communications unit(s) 240 may include one or more network interface cards and may provide communications through the use of either or both physical and wireless communications links. Application 102 is developed by application developer computing system 200 and may subsequently be downloaded by application user computing system 100.

I/O device interface(s)/driver(s) 250 allows for input and output of data with other external components connected to application developer computing system 200. For example, I/O device interface(s)/driver(s) 250 may provide a connection to an external display 252, an external keyboard 254, an external mouse 256, an external storage media 258, and/or some other suitable input/output device.

Figure 3:
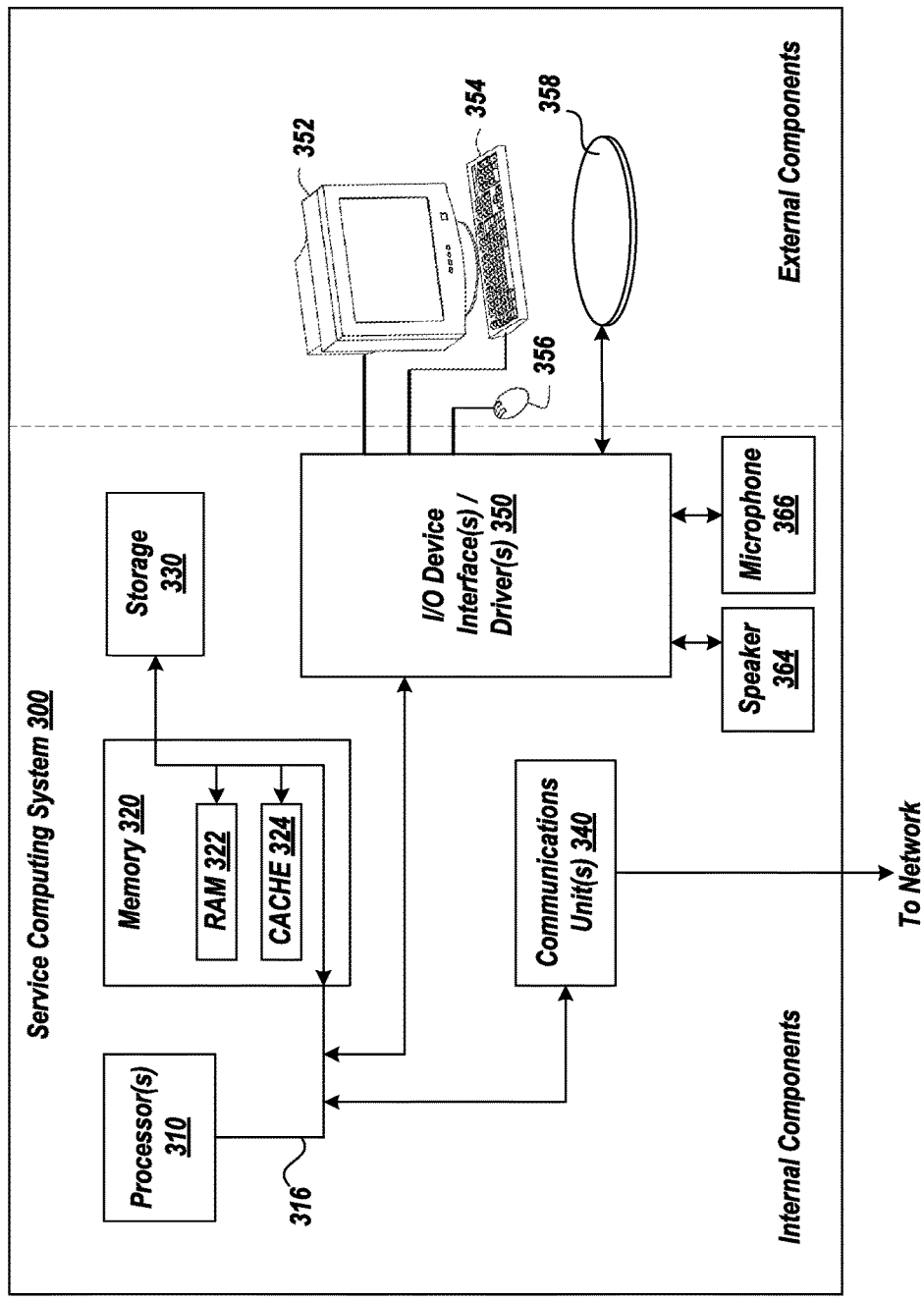
FIG. 3 illustrates an exemplary service computing system, according to one or more embodiments.

FIG. 3 illustrates an exemplary service computing system 300. Service computing system 300 may be utilized in the present embodiments of the invention where a VUI feedback module is contained within computing system 300 and utilized as a service by the application developer computing system 200. Service computing system 300 may include respective sets of internal components and external components. Each of the sets of internal components includes bus 316, which provides communications between at least processor(s) 310, memory 320, persistent storage 330, communications unit(s) 340, and input/output (I/O) interface(s)/driver(s) 350. Memory 320 and persistent storage 330 are examples of computer readable storage devices. Memory 320 may be, for example, one or more random access memories (RAM) 322, cache memory 324, or any other suitable non-volatile or volatile storage device.

The VUI feedback module may synthesize audio speech outputs of training data, simultaneously sense the synthesized audio speech outputs, and feed the sensed synthesized audio speech outputs into a selected speech to text framework. The speech to text framework converts the spoken training data within the synthesized audio speech outputs into text (textualized training data). Audio variables may be integrated into the synthesized audio speech output to simulate differences in user speech voices, accents, volume, background noise, distortions, or the like.

The VUI feedback module may compare the textualized training data to the actual training data and may generate a speech training data structure that identifies the accuracy of the selected speech to text framework in converting the training data within the synthesized audio speech output to textualized training data. The speech training data structure may be utilized by the application developer computing system 200 to identify the training data that is most venerable to misinterpretation when a user interacts with the VUI. As such, the VUI of the application under development within system 200 may subsequently be adjusted to account for the identified vulnerabilities so as to improve the operation of the electronic device 100 evoking the VUI application and/or user experience in interacting with the VUI of the electronic device 100.

Persistent storage 330 can include one or more of flash memory, magnetic disk storage device of an internal hard drive, a solid state drive, a semiconductor storage device, read-only memory (ROM), EPROM, or any other computer-readable storage device that is capable of storing program instructions or digital information. Communications unit(s) 340 provides for communications with other data processing systems or devices. Communications unit(s) 340 may include one or more network interface cards and may provide communications through the use of either or both physical and wireless communications links.

I/O device interface(s)/driver(s) 350 allows for input and output of data with other external components connected to application developer computing system 300. For example, I/O device interface(s)/driver(s) 350 may provide a connection to an external display 352, an external keyboard 354, an external mouse 356, an external storage media 358, and/or some other suitable input/output device. In some embodiments, service computing system 300 may take the form of a non-user type electronic system, such as a server computer, and may therefore be devoid of external display 352, external keyboard 354, external mouse 356, and the like.

Referring to FIG. 1-FIG. 3, the term "computing system" is used herein for convenience only, and in various embodiments is a more general appropriate electronic device or data handling system, such as a mobile phone, tablet, server computer, wearable device, etc. In a particular embodiment, computing system 100 is a smart phone, computing system 200 is a client computer such as desk top computer, and computing system 300 is a host computer such as a server.

In particular embodiments, there may be multiple computers that make up computing system 200 Likewise, in particular embodiments, there may be multiple computers that make up computing system 300. In these embodiments, each similar computer is connected to at least one other similar computer via a network. For example, the application under development within system 200 may be developed by a team of developers with each developer utilizing his or her own computing system 200. Likewise, training data of the application under development may be analyzed by numerous computing systems 300.

Each of the computing systems of the embodiments contains one or more general-purpose programmable processor. In some computing systems, the computing system contains multiple processors typical of a relatively large system such as a server computer. Each processor executes instructions stored in the memory and may comprise one or more levels of on-board cache.

The RAM 122, 222, and/or 322 may store or encode data and programs. In an embodiment, the memory 120, 220, and/or 320 represents the entire virtual memory of the applicable computing system, and may also include the virtual memory of other similar type computing systems coupled thereto via the network. The memory 120, 220, and/or 320 may be conceptually a single monolithic entity, but in other embodiments the memory 120, 220, and/or 320 is a more complex arrangement, such as a hierarchy of caches and other memory devices. For example, memory 120, 220, and/or 320 may exist in multiple levels of caches, and these caches may be further divided by function, so that one cache holds instructions while another holds non-instruction data, which are read or otherwise operated upon by the appropriate processor 110, 210, or 310. Memory 120, 220, and/or 320 may be further distributed and associated with different similarly functioning appropriate processors 110, 210, or 310 or sets of appropriate processors 110, 210, or 310, as is known in any of various so-called non-uniform memory access (NUMA) computer architectures.

Memory 120, 220, and/or 320 stores or encodes an operating system and one or more applications. Although the operating system and applications may be viewed as being contained within the appropriate memory 120, 220, and/or 320, in other embodiments some or all of them may be on a different but similarly functioning computer system and may be accessed remotely, e.g., via the network. The computing system 100, 200, and/or 300 may use virtual addressing mechanisms that allow the programs of the computer 100 to behave as if they have access to a large, single storage entity instead of access to multiple, smaller storage entities. Thus, operating system and applications may not be completely contained in the same storage device at the same time. In an embodiment, the operating system and applications each comprise instructions or statements that execute on the one or more processors 110, 210, or 310 and/or instructions or statements that are called by the instructions or statements that execute on the one or more processors 110, 210, or 310 to carry out the functionality described below. When such program instructions are able to be run by the one or more processors 110, 210, or 310, such computing system becomes a particular machine configured to carry out such instructions.

Processors 110, 210, and/or 310 may function as a general-purpose programmable graphics processor unit (GPU) that builds images (e.g. a GUI) for output to a display. The GPU, working in conjunction with one or more applications, determines how to manipulate pixels of display, such as touch screen, to create a display image or user interface. Ultimately, the image (e.g. GUI, etc.) is displayed to a user via the display. The processors 110, 210, and/or 310 and GPU may be discrete components interconnected by one or more busses or may be integrated into a single component.

Although the bus 116, 216, 316 is shown as a relatively simple, single bus structure providing a direct communication path among the processors, memory, and the I/O device interface/driver, in fact the bus 116, 216, and/or 316 may comprise multiple different buses or communication paths, which may be arranged in any of various forms, such as point-to-point links in hierarchical, star or web configurations, multiple hierarchical buses, parallel and redundant paths, or any other appropriate type of configuration.

Communication unit(s) 140, 240, and/or 340 may contain electronic components and logic to adapt or convert data of one protocol to another protocol. Therefore, communication unit(s) 140, 240, and/or 340 may connect a wide variety of devices or other computers to the appropriate computing system 100, 200, and/or 300, such as, but not limited to, servers, computers, bus adapters, PCI adapters, PCIe adapters, NVLink adapters, using one or more protocols including, but not limited to, Token Ring, Gigabit Ethernet, Ethernet, Fibre Channel, SSA, Fibre Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics connections, etc.

The network may be any suitable network or combination of networks and may support any appropriate protocol suitable for communication of data and/or code to/from the various computing systems. In various embodiments, the network may represent a data handling device or a combination of data handling devices, either connected directly or indirectly to the computing systems. For example, computing system 100 may download the application 102 from computing system 300 by the network or from a particular network (e.g., a seller device) that connects the computing system 100 and computing system 200 and computing system 200 may receive the VUI output data structures from computing system 300 directly or from a particular network that connects computing system 200 and computing system 300. For clarity, though one network is referred to, any number of networks (of the same or different types) may be present.

In another embodiment, the network may support wireless communications. In another embodiment, the network may support hard-wired communications, such as a telephone line or cable. In another embodiment, the network may be the Internet and may support IP (Internet Protocol). In another embodiment, the network is implemented as a local area network (LAN) or a wide area network (WAN). In another embodiment, the network is implemented as a hotspot service provider network. In another embodiment, the network is implemented as any appropriate cellular data network, cell-based radio network technology, or wireless network. In another embodiment, the network is implemented as any suitable network or combination of networks.

FIG. 1-FIG. 3 are intended to depict the representative major components of the applicable computing system. The individual components may have greater complexity than represented in the figures, components other than or in addition to those shown the figures may be present, and the number, type, and configuration of such components may vary.

Figure 4:
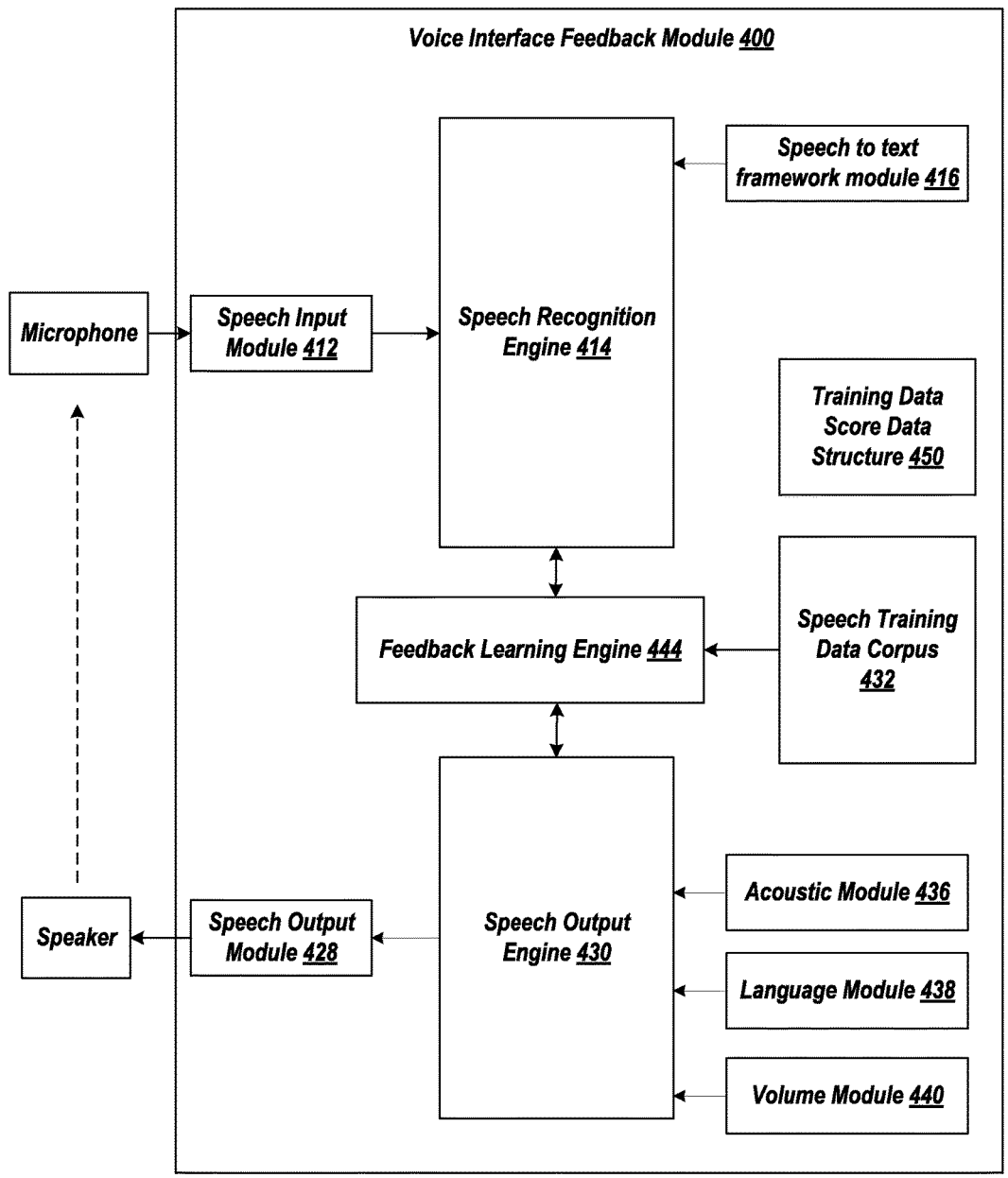
FIG. 4 illustrates an exemplary VUI feedback module, according to one or more embodiments.

FIG. 4 illustrates an exemplary VUI feedback module 400, according to one or more embodiments. VUI feedback module 400 is program instructions stored within a memory (i.e., memory 220 or 320) that when evoked by a processor (i.e., processor 210, 310) causes the processor to perform the functions of the components of the VUI feedback module 400 described herein. VUI feedback module 400 may include a speech input module 412, speech recognition engine 414, speech output module 428, speech output engine 430, speech training data corpus 432, acoustic module 436, language module 438, volume module 440, and/or feedback learning engine 444.

Speech training data corpus 432 is an area or portion of the memory (i.e., memory 220 or 320) that contains training data of the VUI of the application under development within computing system 200. Training data is words, phrases, sentences, or the like (collectively referred herein as training phrases), that are associated with user intents, that when conveyed to and understood by the VUI begins or continues an associated workflow of the application. For example, a user intent "my closest job" can be expressed in a variety of ways, such as "what is my closest job," "where's my closest job," "tell me where the job closest to me is," etc. The application generally performs a predetermined set of functions, referred to herein as workflows, based upon an associated user intent the application determines to be most applicable to speech that is received by the associated VUI. As such, in embodiments, the speech training data corpus 432 may include predetermined training data organized into one or more data structures that collectively include the anticipated user intents that commence or further workflows of the application that is under development within system 200. Such training data may be organized to include or specify a particular user intent and associated one or more training phrases that signify the user intent. For example, an exemplary training data may be organized in a particular data structure that includes a user intent of "my closest job" associated with a workflow of the application that displays directions to the user's closest job and includes an associated exemplary training phrase of "where is my closest job." This particular data structure may be organized as a linked data pair of <my closest job, where is my closest job>. In another data structure, the user intent may be associated with multiple predetermined training phrases that signify the user intent. For clarity, a variety of data structures are contemplated that may be utilized by speech training data corpus 432 to identify a user intent and associated one or more training phrases. For example, such data structures may be organized as a table, database, or the like.

Feedback learning engine 444 reads the one or more data structures that contain user intents and associated training phrases. The feedback learning engine 444 identifies a particular training phrase and passes the identified training phrase to speech output engine 430. For example, feedback learning engine 444 reads the data structure <my closest job, where is my closest job>, identifies the training phrase "where is my closest job" and passes the training phrase "where is my closest job" to the speech output engine 430.

Speech output engine 430 generates an audio speech output data structure, such as an audio file, or the like that at least includes data of synthesized human speech of an associated training phrase, that when called by speech output module 428 in tandem with a transducer or speaker, the synthesized human speech of the associated training phrase is audibly presented upon the transducer or speaker.

Speech output engine 430 may further create the audio speech output with a selected one or more acoustic variants as indicated by acoustic model 436, such as background noise, distortions, or the like. Speech output engine 430 may further create the audio speech output with a selected synthesized human speech as indicated by acoustic model 436 to specify the language, dialect, accent, or the like of the synthesized human speech. Speech output engine 430 may further create the audio speech output with a selected volume prescribed to the synthesized human speech and/or to the one or more acoustic variants as prescribed by the volume module 440.

Acoustic module 436 receives one or more selections via a user interface (e.g., a GUI displayed upon a display of system 200 or 300, etc.) of acoustic variants that modify the synthesized human speech of the associated training phrase. Exemplary acoustic variants may be background noise, speech setting or location, and/or distortions.

A selected background noise may be so specified upon the acoustic module 436 receiving a selection thereof as an acoustic variant to modify the synthesized human speech of the associated training phrase. For example, a selected background noise may be "beach." In such example, speech output engine 430 generates an audio speech output data structure of the synthesized human speech of the associated training phrase with simulated beach background sounds that when called by speech output module 428 in tandem with the transducer or speaker, the synthesized human speech of the associated training phrase with beach background noise is audibly presented upon the transducer or speaker. A non-exhaustive list of contemplated background noises are as follows: stadium/large crowd sounds, city environment sounds, outdoor sounds, or the like.

A selected speech setting or location may be so specified upon the acoustic module 436 receiving a selection thereof as an acoustic variant to modify the synthesized human speech of the associated training phrase. For example, a selected speech location as an "empty warehouse." In such example, speech output engine 430 generates an audio speech output data structure that when called, in tandem with the transducer or speaker, the synthesized human speech of the associated training phrase is audibly presented upon the transducer or speaker sounding as if the synthesized human speech of the associated training phrase was spoken in a cavernous warehouse. In another example, a selected speech setting may be a "filtered voice." In such example, speech output engine 430 generates an audio speech output data structure that when called, in tandem with the transducer or speaker, the synthesized human speech of the associated training phrase is audibly presented upon the transducer or speaker sounding as if background noises have been filtered from the synthesized human speech of the associated training phrase or partially filtered from the synthesized human speech of the associated training phrase.

A selected distortion may be so specified upon the acoustic module 436 receiving a selection thereof as an acoustic variant to modify the synthesized human speech of the associated training phrase. One particular distortion type specifies to the distortions of audio signals as the audio signals are transferred across a network. In such example, a selected distortion may be "network distortion." In such example, speech output engine 430 generates an audio speech output data structure that when called, in tandem with the transducer or speaker, the synthesized human speech of the associated training phrase is audibly presented upon the transducer or speaker sounding as if the synthesized human speech of the associated training phrase was previously packetized and subject to packet loss. In another example, a selected distortion may be "cell tower handoff." In this example, speech output engine 430 generates an audio speech output data structure that when called, in tandem with the transducer or speaker, the synthesized human speech of the associated training phrase is audibly presented upon the transducer or speaker sounding as if the synthesized human speech of the associated training phrase was previously subject to packet routing during cell network handoff operations. Another particular distortion type specifies the distortions associated with capturing human speech. For example, a selected distortion may be "low microphone." In this example, speech output engine 430 generates an audio speech output data structure that when called, in tandem with the transducer or speaker, the synthesized human speech of the associated training phrase is audibly presented upon the transducer or speaker sounding as if the synthesized human speech of the associated training phrase was previously captured with a low level microphone. In another example, a selected distortion may be "blocked microphone." In this example, speech output engine 430 generates an audio speech output data structure that when called, in tandem with the transducer or speaker, the synthesized human speech of the associated training phrase is audibly presented upon the transducer or speaker sounding as if the synthesized human speech of the associated training phrase was previously captured with a blocked or muffled microphone.

Language module 438 receives one or more selections via the user interface of speech settings to specify a particular synthesized human speech type. Exemplary speech settings may be speaker voice, speaker language, regional language dialect, local language dialect, or the like.

A selected speech setting may be so specified upon the acoustic language module 438 receiving a selection thereof to specify a particular synthesized human speech type of the associated training phrase. One particular speech setting specifies the synthesized voice type of the synthesized human speech of the associated training phrase. For example, a selected voice type may be "young male." In this example, speech output engine 430 generates an audio speech output data structure that when called, in tandem with the transducer or speaker, the synthesized human speech of the associated training phrase is audibly presented upon the transducer or speaker with the voice of a young male. Other selected voice types may be "young female," "middle age male," "middle age female," "elderly male," and "elderly female."

Another particular speech setting specifies the language of the synthesized human speech of the associated training phrase. For example, a selected language may be "English." In this example, speech output engine 430 generates an audio speech output data structure that when called, in tandem with the transducer or speaker, the synthesized human speech of the associated training phrase is audibly presented upon the transducer or speaker in the English language. Another particular speech setting specifies to a regional language dialect of the synthesized human speech of the associated training phrase. For example, a selected regional dialect may be "American English." In this example, speech output engine 430 generates an audio speech output data structure that when called, in tandem with the transducer or speaker, the synthesized human speech of the associated training phrase is audibly presented upon the transducer or speaker in a American English language regional dialect. Another particular speech setting specifies to the local dialect of the synthesized human speech of the associated training phrase. In this example, speech output engine 430 generates an audio speech output data structure that when called, in tandem with the transducer or speaker, the synthesized human speech of the associated training phrase is audibly presented upon the transducer or speaker in a New York City accent or local dialect.

Volume module 438 receives one or more selections via the user interface of volume or level settings to specify a particular volume or level of the synthesized human speech of the associated training phrase and/or to specific a particular volume, level, or degree of the distortion(s) specified by the acoustic module 436.

A particular volume setting specifies the volume or level of the synthesized human speech of the associated training phrase. For example, a selected volume or level may be "low." In this example, speech output engine 430 generates an audio speech output data structure that when called, in tandem with the transducer or speaker, the synthesized human speech of the associated training phrase is audibly presented upon the transducer or speaker at a low volume.

A particular speed setting specifies the speed of the synthesized human speech of the associated training phrase. For example, a selected volume or level may be "fast." In this example, speech output engine 430 generates an audio speech output data structure that when called, in tandem with the transducer or speaker, the synthesized human speech of the associated training phrase is audibly presented upon the transducer or speaker at faster than average human speech rate.

Another particular volume setting specifies the volume or level of the distortions of the synthesized human speech. For example, a selected background volume or level may be "high." In this example, speech output engine 430 generates an audio speech output data structure that when called, in tandem with the transducer or speaker, the synthesized human speech of the associated training phrase is audibly presented upon the transducer or speaker along with the specified background noise at a high volume.

In another example, a selected level of network distortions may be "high." In this example, speech output engine 430 generates an audio speech output data structure that when called, in tandem with the transducer or speaker, the synthesized human speech of the associated training phrase is audibly presented upon the transducer or speaker as if the synthesized human speech of the associated training phrase was previously transmitted with a high level of network distortions.

In another example, a selected level of microphone distortion may be "high." In this example, speech output engine 430 generates an audio speech output data structure that when called, in tandem with the transducer or speaker, the synthesized human speech of the associated training phrase is audibly presented upon the transducer or speaker as if the synthesized human speech of the associated training phrase was previously recorded with a highly blocked microphone.

Speech output module 428 is an interface between a signal to sound transducer or speaker and the speech output engine 430 that enables the synthesized human speech of the associated training phrase within the audio speech output data structure to be converted from a signal associated with the speech output engine 430 to being audibly presented upon the transducer or speaker. The transducer or speaker may be speaker 264 or speaker 364 local in the same computing system 200 or 300 as where module 400 is located.

Similarly, speech input module 412 is an interface between a sound to signal transducer or microphone and the speech recognition engine 414 that enables audibly presented synthesized human speech of the associated training phrase to be converted into a signal to be processed by the speech recognition engine 414. The transducer or microphone may be microphone 266 or speaker 366 local in the same computing system 200 or 300 as where module 400 is located.

Feedback learning engine 444 directs that synthesized human speech of the associated training phrase be audibly presented upon the transducer/speaker and simultaneously received by transducer/microphone. In other words, feedback learning engine creates a feedback loop where the synthesized human speech of the associated training phrase is audibly presented upon the transducer/speaker is received by the transducer/microphone.

Speech recognition engine 414 receives the signal of the synthesized human speech of the associated training phrase received by the transducer/microphone from speech input module 412 and converts the signal of the synthesized human speech of the associated training phrase into text utilizing a speech to text framework. The text of the speech to text converted synthesized human speech of the associated training phrase by speech recognition engine 414 is herein referred to as the textualized training phrase. Various speech recognition engines 414 are generally known in the art.

Speech to text framework module 416 receives one or more selections via the user interface to specify a particular speech to text framework that should be utilized by the speech to text recognition engine 414 to convert the signal of the synthesized human speech received by the transducer/microphone into text.

Feedback learning engine 444 compares the text of the known training phrase as defined within the data structure(s) stored in speech training data corpus 432 utilized as input by speech output engine 430 to the textualized training phrase that was determined by speech recognition engine 414 to determine how similar the known training phrase is to the textualized training phrase. In other words, feedback learning engine creates a feedback loop where the synthesized human speech is audibly presented upon the transducer/speaker is received by the transducer/microphone. Feedback learning engine 444 may utilize known text comparison routines, grammar comparison routines, or the like to compare the known training phrase to the textualized training phrase.

Feedback learning engine 444 assigns a score to the textualized training phrase based upon similarity of the textualized training phrase to the known training phrase. The score may be an accuracy score that indicates how similar the textualized training phrase is to the known training phrase or how accurate the speech to text conversion processes were during the creation of the textualized training phrase by speech recognition engine 414. In such a scenario, a high accuracy score may indicate that the textualized training phrase is highly similar to the known training phrase or the speech to text conversion processes by speech recognition engine 414 were highly accurate.

Alternatively, the score may be an error score that indicates how dissimilar the textualized training phrase is to the known training phrase or how inaccurate the speech to text conversion processes were during the creation of the textualized training phrase by speech recognition engine 414. In such a scenario, a high error score may indicate that the textualized training phrase is highly dissimilar to the known training phrase or the speech to text conversion processes by speech recognition engine 414 was highly inaccurate.

Feedback learning engine 444 generates a speech training data structure 450 that may include the known training phrase, the textualized training phrase, the comparison score of the textualized training phrase to the known training phrase, an identifier of the selection received by speech to text framework module 436, an identifier or identifiers of the selection(s) received by acoustic module 436, an identifier or identifiers of the selection(s) received by language module 438, and/or an identifier or identifiers of the selection(s) received by volume module 440.

The speech training data structure 450 may be utilized by the application developer computing system 200 to identify the training data within speech training data corpus 432 that is most venerable to misinterpretation by various speech to text frameworks of a recognition engine utilized by the VUI of the application being therein developed. As such, the VUI of the application under development may subsequently be adjusted to account for the identified vulnerabilities so as to improve the operation of the electronic device 100 that will evoke the VUI of the application and/or the experience of a user interacting with the VUI of the of the application evoked by electronic device 100.

Figure 5:
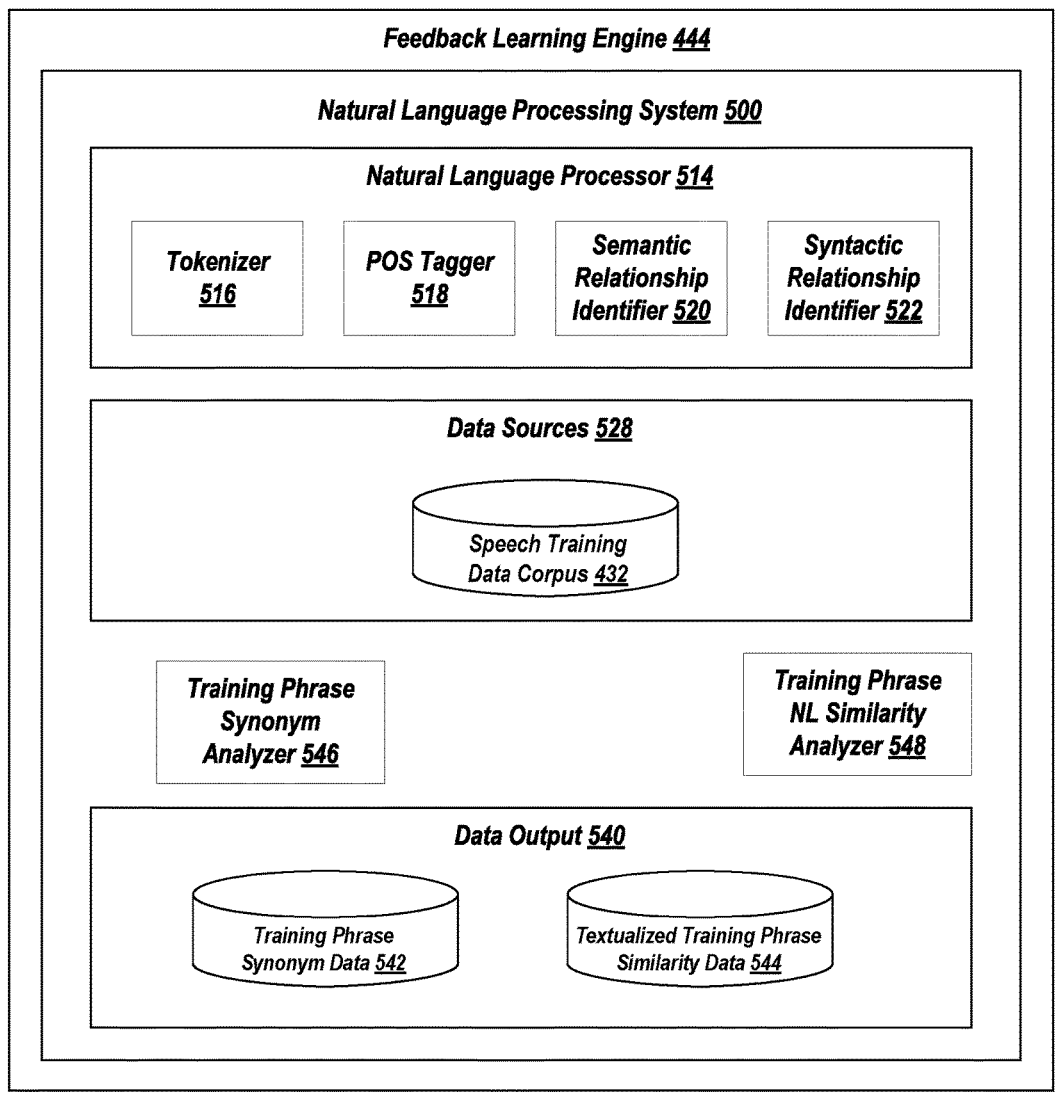
FIG. 5 illustrates an exemplary natural language processing system, according to one or more embodiments.

FIG. 5 illustrates an exemplary natural language processing system 500, according to one or more embodiments. In some embodiments, feedback learning engine 444 may include natural language processing system 500. Subsequent to feedback learning engine 444 identifying a particular training phrase, natural language processing system 500 may process the particular training phrase to determine synonyms of the particular training phrase. The synonyms of a training phrase may be referred herein as simply training phrases or as training phrase synonyms.

Subsequent to feedback learning engine 444 reading the data structure <my closest job, where is my closest job> and identifying the training phrase "where is my closest job," feedback learning engine 444 passes the training phrase "where is my closest job" to natural language processing system 500. Natural language processing system 500 may, in turn, process the training phrase "where is my closest job" to determine synonyms such as, "what is my closest job," "where's my closest job," "tell me where the job closest to me is," etc. Feedback learning engine 444 may subsequently treat the determined synonyms as if they were training phrases as was previously described. The inclusion of natural language processing system 500 within feedback learning engine 444 may be beneficial when there are few training phrases associated with user intents within the speech training data corpus 432.

In embodiments, natural language processing system 500 may further be utilized to compare the textualized training phrase with the actual training phrase to determine the similarity of the textualized training phrase to the actual training phrase. For example, natural language processing system 500 may determine whether the textualized training phrase (i.e., individual words or the like) and the actual training phrase that share the same part of speech, whether the textualized training phrase and the actual training phrase share the same semantic relationships, and/or whether the textualized training phrase and the actual training phrase share the same syntactic relationships, or the like.

Natural language processing system 500 is a module or program instructions that are configured generate synonyms to training phrases included in speech training data corpus 432 and/or to compare the textualized training phrase with the actual training phrase to determine the similarity of the textualized training phrase to the actual training phrase.

Consistent with various embodiments, the natural language processing system 500 may respond to the input of a particular training phrase. Specifically, a training phrase synonym analyzer 546 may analyze the particular training phrase against one or more dictionaries and/or thesauruses within data sources 528 to determine a list of one or more training phrase synonyms of the particular training phrase. Training phrase synonym analyzer 546 may subsequently store the list of one or more training phrase synonyms within training phrase synonym data 542 within a data output 540 of natural language processing system 500. Training phrase synonym data 542 is an area or portion of the memory (i.e., memory 220 or 320) that contains training data synonym data of the training data of the VUI of the application under development within computing system 200.

Consistent with various embodiments, natural language processing system 500 may respond to the query of determining the similarity between a predetermined training phrase and its associated textualized training phrase. Specifically, a textualized training phrase similarity analyzer 548 compares the textualized training phrase with the actual training phrase to determine the similarity of the textualized training phrase to the actual training phrase. The textualized training phrase similarity analyzer 548 may determine the similarity textualized training phrase and the actual training phrase utilizing a character by character comparison of the letters, words, or the like of the textualized training phrase and the actual training phrase. Alternatively, or in addition to, the textualized training phrase similarity analyzer 548 may determine the similarity textualized training phrase and the actual training phrase utilizing tokenizer 516, part of speech (POS) tagger 518, semantic relationship identifier 520, and/or syntactic relationship identifier to determine textualized training phrase and the actual training phrase share the same tokens, parts of speech, semantic relationships, and/or syntactic relationships.

The natural language processor 514 may be a module or program instructions that analyze the text of training phrases or textualized training phrases. The natural language processor 514 may perform various methods and techniques for analyzing the text of training phrases or textualized training phrases (e.g., syntactic analysis, semantic analysis, etc.). The natural language processor 514 may be configured to recognize and analyze the text of any number of natural languages. In some embodiments, the natural language processor 514 may parse text strings, words, phrases, numbers, and/or passages of the text of training phrases or textualized training phrases. Further, the natural language processor 514 may include various modules to perform analyses of the text of training phrases or textualized training phrases. These modules may include, but are not limited to, tokenizer 516, POS tagger 518, a semantic relationship identifier 520, and/or a syntactic relationship identifier 522.

In some embodiments, the tokenizer 516 may be a computer module that performs lexical analysis. The tokenizer 516 may convert a sequence of characters into a sequence of tokens. A token may be a string of characters included in association with training phrases or textualized training phrases and categorized as a meaningful symbol. Further, in some embodiments, the tokenizer 516 may identify word boundaries in training phrases or textualized training phrases and break any text passages within the training phrases or textualized training phrases into their component text elements, such as words, multiword tokens, numbers, and punctuation marks. In some embodiments, the tokenizer 516 may receive a string of characters associated with each training phrase or textualized training phrase, identify the lexemes in the string, and categorize them into tokens.

Consistent with various embodiments, the POS tagger 518 may be a computer module that marks up a word in a passage or phrase to correspond to a particular part of speech. The POS tagger 518 may read a passage or other text in natural language and assign a part of speech to each word or other token. The POS tagger 518 may determine the part of speech to which a word (or other text element) corresponds based on the definition of the word and the context of the word. The context of a word may be based on its relationship with adjacent and related words in a phrase, sentence, paragraph, or the like. In some embodiments, the context of a word may be dependent on one or more previously analyzed training phrases or textualized training phrases (e.g., the content of one training phrase or textualized training phrase may shed light on the meaning of text elements in another training phrase or textualized training phrase, particularly if they relate to the same user intent). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a word or passage with part of speech categories. In some embodiments, the POS tagger 518 may tag tokens or words of a passage to be parsed by other components of the natural language processing system 500.

In some embodiments, the semantic relationship identifier 520 may be a computer module that is configured to identify semantic relationships of recognized text elements (e.g., words, phrases) of training phrases or textualized training phrases. In some embodiments, the semantic relationship identifier 520 may determine functional dependencies between entities and other semantic relationships.

Consistent with various embodiments, the syntactic relationship identifier 522 may be a computer module that is configured to identify syntactic relationships in a word or passage composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may parse a data structure that contain training phrases or textualized training phrases and generate corresponding data structures for one or more portions of the applicable input. For example, in response to receiving training phrase or textualized training phrase, the natural language processor 514 may output parsed text elements related to the training phrase or textualized training phrase as data structures. In some embodiments, a parsed text element may be represented in the form of a parse tree or other graph structure. To generate the parsed text element, the natural language processor 514 may trigger computer modules 516-524.

In some embodiments, data sources 528 may include data warehouses, information corpora, data models, and/or document repositories. The data sources 528 may enable data storage and retrieval. In some embodiments, the data sources 528 may be a storage mechanism that houses a standardized, consistent, clean, and integrated dictionaries, thesauruses, or the like. Data stored in the data sources 528 may be structured in a way to specifically address analytic requirements. For example, the data sources 528 may receive the ingested words or phrase as a query in order to return a list of synonyms to that words or phrase easier. In some embodiments, the data sources 528 may be a relational database.

Analyzer 546 may generate an output data structure of synonyms of training phrases within training phrase synonym data 542 of data output 540. Analyzer 548 may generate an output data structure that indicates the similarity of a textualized training phrase to its actual training phrase within textualized training phrase similarity data 544 within data output 540.

In some embodiments, data output 540 may include data warehouses, information corpora, data models, and/or document repositories. The data output 540 may enable data storage and retrieval. In some embodiments, data output 540 may be a storage mechanism that houses natural language processing system 500 training phrase synonym and textualized training phrase similarity data structures, respectively. Data stored in the data output 540 may be structured in a way to specifically address integration into training data score data structure 450. In some embodiments, the data output 540 may be a relational database.

Figure 6:
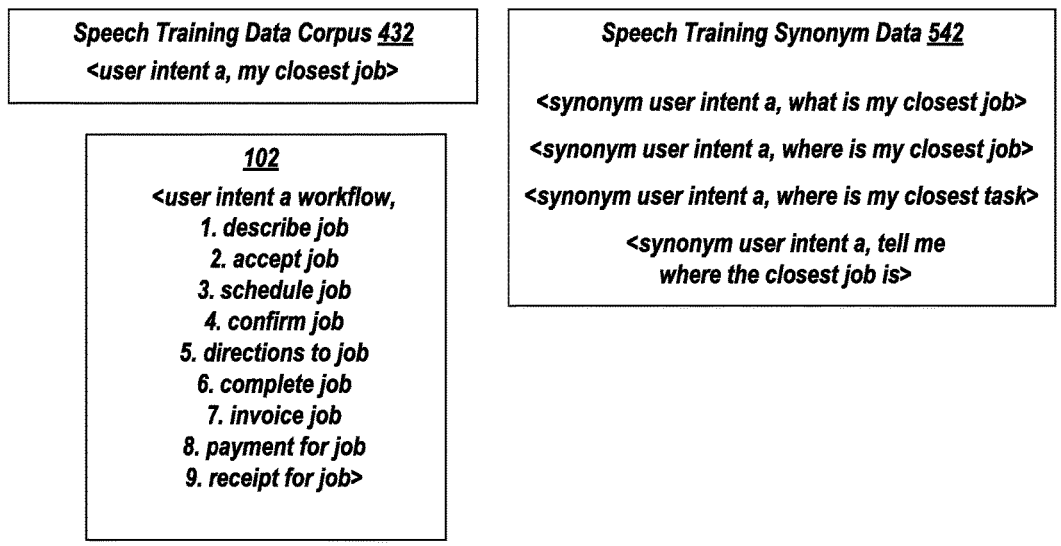
FIG. 6 illustrates an exemplary training data structure within speech training data corpus, exemplary synonym data structures within speech training synonym data, and an exemplary workflow data structure within an application, according to one or more embodiments.

FIG. 6 illustrates an exemplary data structure within speech training data corpus 432, an exemplary data structure within speech training synonym data 543, and an exemplary data structure within an application in which the user may interact with the associated computing system 100 utilizing a VUI, according to one or more embodiments. The data structure within speech training data corpus 432 may include a particular user intent (i.e., "user intent a") and an associated training phrase "my closest job." The training phrase "my closest job" may be analyzed by training phrase synonym analyzer 546 in which it is determined that the training phrase "my closest job" has synonyms "what is my closest job," "where is my closest job," "where is my closest task," and "tell me where the closest job is." Training phrase synonym analyzer 546 may generate the exemplary data structure by associating the original user intent with each training phrase synonym (as is shown) or by associating the training phrase with each training phrase synonym. The training phrase "my closest job" and the synonyms my closest job" has synonyms "what is my closest job," "where is my closest job," "where is my closest task," and "tell me where the closest job is," may be subject to the feedback loop of feedback learning engine 444 to generate the textualized training phrases, respectively, of the training phrase "my closest job" and the synonyms my closest job" has synonyms "what is my closest job," "where is my closest job," "where is my closest task," and "tell me where the closest job is."

The "user intent a" may be associated with a workflow or predefine process within the application in which the user may interact with the associated computing system 100 utilizing a VUI. For example, the workflow associated with "user intent a" may be: describe job, receive acceptance of job, schedule job, confirm job, give directions to job, receive completion indication of job, send invoice for job, request payment for job, and receive payment confirmation for job. The user of the application in which the user may interact with the associated computing system 100 may utilize the VUI to start or continue the components of the workflow via speech interaction with the VUI. As such, it is important for the improved functioning of system 100 for the VUI to be able to understand the various different ways the user may direct via speech the system 100 to proceed with the predefined work flow. The embodiments herein describe techniques that highlight which training phrases and/or which training phrase synonyms are understood or misunderstood by various different simulated user voices speaking such phrases to allow the system 200 to improve the misunderstood phrases by the VUI.

Figure 7:
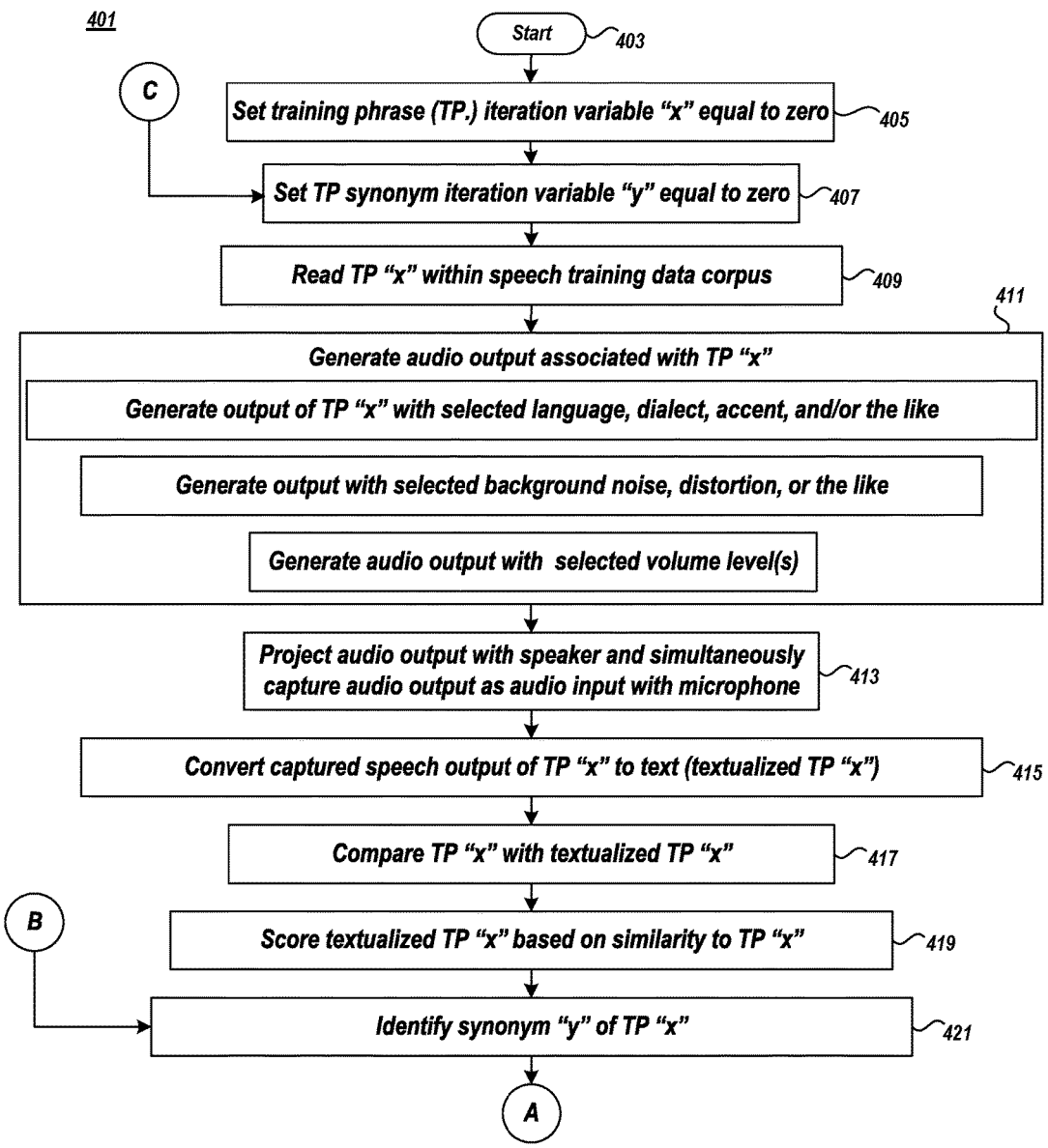
FIG. 7 and FIG. 8 illustrate an exemplary method for optimizing training data within VUI of an electronic device application, according to one or more embodiments.
Figure 8:
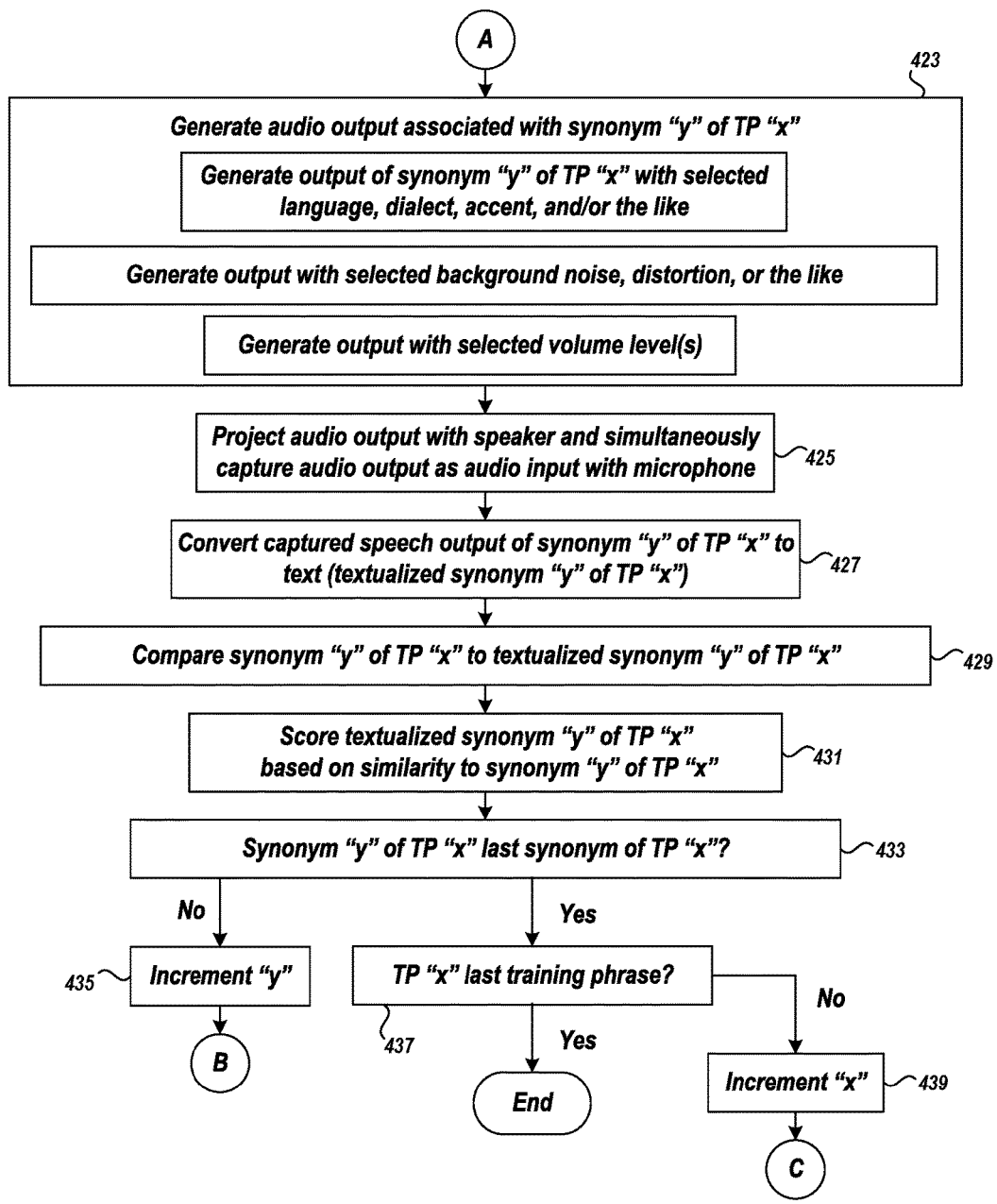

FIG. 7 and FIG. 8 illustrate an exemplary method 401 for optimizing training data within VUI of an electronic device application, according to one or more embodiments. Method 401 may be utilized by voice interface feedback module 400 to indicate a score, such as an accuracy score, an error score, or the like, that indicates a comparison between training phrases and textualized training phrases. The scores of the various training phrases may be utilized to rank the training phrases by those textualized training phrases that are most dissimilar to its training phrase due to variations in the synthesized human speech of the training phrase, due to the distortions of the synthesized human speech of the training phrase, etc., thereby indicating those training phrases that are most susceptible to be associated with the VUI misunderstanding the user's speech. The application VUI may be modified within system 200 to that the VUI may better understand those training phrases that are most susceptible to be associated with the VUI misunderstanding the user's speech. Method 401 may be iteratively conducted for each user intent of the VUI of the application under development in system 200.

Method 401 begins, at block 403, with feedback module 400 reading one or more data structures that contain training data from speech training data corpus 432. Method 401 may continue with setting a training phrase iteration variable "x" equal to zero (block 405). By setting the training phrase iteration variable "x" equal to zero a particular training phrase (training phrase x) is identified and is involved in subsequent operations. Method 401 may continue with setting a training phrase synonym iteration variable "y" equal to zero (block 407). By setting the training phrase synonym iteration variable "y" equal to zero a training phrase synonym associated with training phrase x is identified and is involved in subsequent operations.

Method 401 may continue by reading, isolating, feeding, or the like, the identified training data x into a text to speech engine (block 409). For example, speech output engine 430 reads the text of training data x and converts the text of training data x into a data structure to be included in a audio output that when called by speech output module 428 in tandem with a transducer or speaker, the training data x is audibly presented upon the transducer or speaker as a synthesized human voice speaking training data x.

Method 401 may continue by generating an audio output audio that when called by speech output module 428 in tandem with a transducer or speaker, the training data x is audibly presented upon the transducer or speaker as a synthesized human voice speaking training data x (block 411). In some embodiments, the audio output includes the synthesized human voice with a selected spoken human voice, a selected spoken human language, a selected regional dialect, a selected local dialect, or the like. In some embodiments, the audio output may include the synthesized human voice along with an acoustic modifier that modifies the sound of the synthesized human voice, such as a selected simulated background noise, a selected distortion or filter, a selected simulated spoken location, or the like. In some embodiments, the audio output includes an selected volume or a selected level of the synthesized human voice and/or the acoustic modifier(s) are implemented.

Method 401 may continue with projecting or otherwise presenting the audio output, in tandem with a transducer or speaker, so that the training data x is audibly presented upon the transducer or speaker as a synthesized human voice speaking training data x and simultaneously capturing the synthesized human voice speaking training data x with a transducer or microphone (block 413). For example, the electrical signal of the audio output is converted by the transducer or speaker (speaker 264, speaker 364) to an audio output as a synthesized human voice speaking training data x and this synthesized human voice speaking training data x of the audio output is simultaneously (i.e. at the speed of sound as the microphone and the speaker are local to the same computer system 200 or 300), captured the with the transducer or microphone (microphone 266, microphone 366) and converted from an audio signal to an electrical signal.

Method 401 may continue by converting the signal of the synthesized human speech of training phrase x into textualized training phrase x utilizing a selected speech to text framework (block 415). For example, speech recognition engine 414 receives the signal of the synthesized human speech of training data x and converts the signal of the synthesized human speech of the training data x into text utilizing a speech to text framework. The framework may be selected via speech to text framework module 416 which receives a selection of a particular framework via the user interface to specify a particular speech to text framework that should be utilized by the speech to text recognition engine 414 to convert the signal of training data x into text.

Method 401 may continue by comparing the textualized training phrase x with training phrase x to determine the similarity between the textualized training phrase x with training phrase x (block 417). For example, feedback learning engine 444 compares the text of the known training phrase x to the text of the textualized training phrase x to determine how similar the known training phrase is to the textualized training phrase. Feedback learning engine 444 may compare the text of the known training phrase x to the text of the textualized training phrase x by a character comparison of the text of the known training phrase x and the text of the textualized training phrase x. Alternatively, or in addition to, feedback learning engine 444 may determine the similarity of the text of textualized training phrase x and the text of training phrase x utilizing tokenizer 516, part of speech (POS) tagger 518, semantic relationship identifier 520, and/or syntactic relationship identifier to determine whether the text of textualized training phrase x and training phrase x share the same tokens, parts of speech, semantic relationships, and/or syntactic relationships.

Method 401 may continue with assigning a score to the textualized training phrase x and/or the training phrase x based upon the similarity between the textualized training phrase x with training phrase x (block 419). For example, feedback learning engine 444 assigns an accuracy or error score to textualized training phrase x based upon similarity of textualized training phrase x to training phrase x.

Method 401 may continue by reading, isolating, feeding, or the like, the identified synonym y of training data x into a text to speech engine (block 421). For example, speech output engine 430 reads the text of the synonym y of training data x and converts the text of the synonym y of training data x into a data structure to be included in a audio output that when called by speech output module 428 in tandem with a transducer or speaker, the synonym y of training data x is audibly presented upon the transducer or speaker as a synthesized human voice speaking the synonym y of training data x. In embodiments, the synonym of the training data, or training data synonym, or the like may be a predetermined synonym that is associated with the same user intent or associated with the same training phrase within corpus 432. In alternative embodiments, the synonym of the training data, or training data synonym, or the like may be a dynamically determined synonym by engine 444, via natural language processing system 500, that is associated with the same user intent as the training phrase or associated with the training phrase within training phrase synonym data 542.

Method 401 may continue by generating an audio output audio that when called by speech output module 428 in tandem with a transducer or speaker, the synonym y of training data x is audibly presented upon the transducer or speaker as a synthesized human voice speaking the synonym y of training data x (block 423). In some embodiments, the audio output includes the synthesized human voice with a selected spoken human voice, a selected spoken human language, a selected regional dialect, a selected local dialect, or the like, of the synonym y of training data x. In some embodiments, the audio output may include the synthesized human voice along with an acoustic modifier that modifies the sound of the synthesized human voice, such as a selected simulated background noise, a selected distortion or filter, a selected simulated spoken location, or the like. In some embodiments, the audio output includes a selected volume or a selected level of the synthesized human voice and/or the acoustic modifier(s) are implemented.

Method 401 may continue with projecting or otherwise presenting the audio output, in tandem with a transducer or speaker, so that the synonym y of training data x is audibly presented upon the transducer or speaker as a synthesized human voice speaking the synonym y of training data x and simultaneously capturing the synthesized human voice speaking the synonym y of training data x with a transducer or microphone (block 425). For example, the electrical signal of the audio output is converted by the transducer or speaker (speaker 264, speaker 364) to an audio output as a synthesized human voice speaking the synonym y of training data x and this synthesized human voice speaking the synonym y of training data x of the audio output is simultaneously (i.e. at the speed of sound as the microphone and the speaker are local to the same computer system 200 or 300), captured the with the transducer or microphone (microphone 266, microphone 366) and converted from an audio signal to an electrical signal.

Method 401 may continue by converting the signal of the synthesized human speech of the synonym y of training data x into textualized the synonym y of training data x utilizing a selected speech to text framework (block 427). For example, speech recognition engine 414 receives the signal of the synthesized human speech of the synonym y of training data x and converts the signal of the synthesized human speech of the synonym y of training data x into text utilizing a speech to text framework. The framework may be selected via speech to text framework module 416 which receives a selection of a particular framework via the user interface to specify a particular speech to text framework that should be utilized by the speech to text recognition engine 414 to convert the signal of the synonym y of training data x into text.

Method 401 may continue by comparing the textualized synonym y of training data x with the synonym y of training data x to determine the similarity between the textualized the synonym y of training data x with the synonym y of training data x (block 429). For example, feedback learning engine 444 compares the text of the known synonym y of training data x to the text of the textualized synonym y of training data x to determine how similar the known synonym y of training data x is to the textualized the synonym y of training data x. Feedback learning engine 444 may compare the text of the known synonym y of training data x to the text of the textualized synonym y of training data x by a character comparison. Alternatively, or in addition to, feedback learning engine 444 may determine the similarity of the text of textualized synonym y of training data x and the text of the synonym y of training data x utilizing tokenizer 516, part of speech (POS) tagger 518, semantic relationship identifier 520, and/or syntactic relationship identifier to determine whether the text of textualized synonym y of training data x and the synonym y of training data x share the same tokens, parts of speech, semantic relationships, and/or syntactic relationships.

Method 401 may continue with assigning a score to the textualized synonym y of training data x and/or the synonym y of training data x based upon the similarity between the textualized synonym y of training data x with the synonym y of training data x (block 431). For example, feedback learning engine 444 assigns an accuracy or error score to the textualized synonym y of training data x based upon similarity of the textualized synonym y of training data x to the synonym y of training data x.

Method 401 may continue with determining if the textualized synonym y of training data x is the last synonym of training phrase x (block 433). If the textualized synonym y of training data x is the last synonym of training phrase x, it is determined whether the training phrase x is the last training phrase associated with the user intent (block 437). If the textualized synonym y of training data x is not the last synonym of training phrase x, the variable "y" is incremented (block 435), and method 401 returns to block 421. If it is determined that the training phrase x is not the last training phrase associated with the user intent, the variable "x" is incremented (block 439) and method 401 returns to block 407. If it is determined that the training phrase x is the last training phrase associated with the user intent method 401 ends and may be repeated in a next user intent data structure within corpus 432.

FIG. 9 depicts speech training data structure 450, organized as a table, associated with a particular user intent "forecast weather" that includes a score column, a training phrase column, a textualized training phrase column, a speaker voice column, a language column, a region column, a dialect column, an acoustic setting column, and a volume setting column. The rows of the data structure associate a particular calculated score of the similarity of the training phrase to the textualized training phrase with the indicated voice setting of the of the speaker of the training phrase, the indicated language of the simulated voice speaker of the training phrase, the indicated regional dialect of the simulated voice speaker of the training phrase, the indicated local dialect of the simulated voice speaker of the training phrase, the indicated acoustic model sections that modify or filter the simulated voice speaker of the training phrase, and the indicated level or volume selections of the simulated voice speaker of the training phrase and/or the acoustic model sections. The contents of the data structure 450 may be organized by accuracy score such that those textualized training phrases that are most similar to their associated training phrases are ranked highest in the data structure.

FIG. 10 depicts speech training data structure 450, organized as a table, associated with a particular user intent "start job" that includes a score column, a user intent column, a training phrase column, a textualized training phrase column, a speaker voice column, a language column, an acoustic setting column, and a volume setting column. The rows of the data structure associate a particular calculated score of the similarity of the training phrase to the textualized training phrase with the indicated voice setting of the of the speaker of the training phrase, the indicated language of the simulated voice speaker of the training phrase, the indicated acoustic model sections that modify or filter the simulated voice speaker of the training phrase, and the indicated level or volume selections of the simulated voice speaker of the training phrase and/or the acoustic model sections. The contents of the data structure 450 may be organized by error score such that those textualized training phrases that are most dissimilar to their associated training phrases are ranked highest in the data structure.

The exemplary speech training data structures 450 of FIG. 9 and FIG. 10 may further include other contents, such as a speech to text framework selection column that indicates the selected speech to text framework utilized to convert the audio output of the simulated voice speaker of the training phrase to text, such as a training phrase synonym column that indicates a dynamically determined synonym of the associated training phrase by system 500, or the like.

Figure 11:
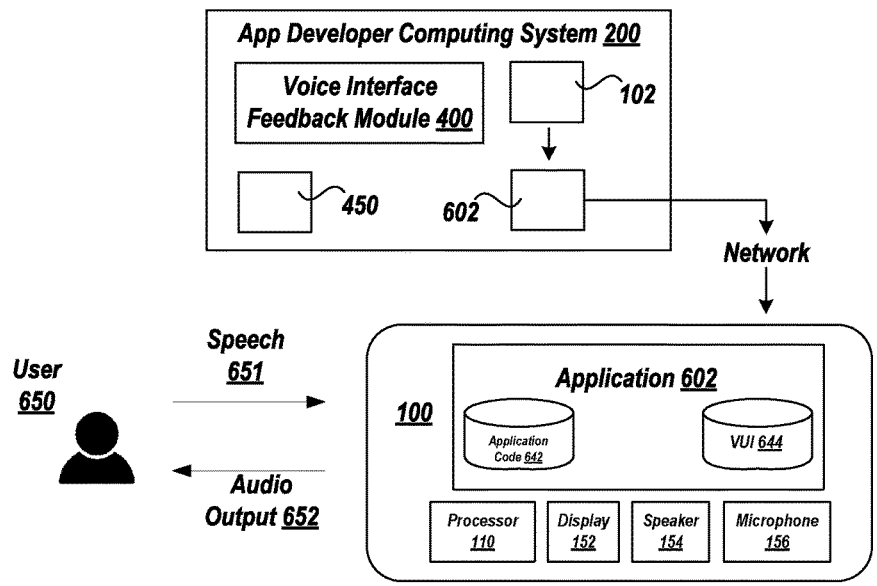
FIG. 11 illustrates an exemplary system wherein the VUI feedback module is local to the application developer computing system, according to one or more embodiments.

FIG. 11 illustrates an exemplary system wherein the VUI feedback module 400 is local to the application developer computing system 200. In these embodiments, the module 400 is local to system 200, or the like computing device, and generates the output data structure 450 and outputs at least a portion of the output data structure 450 upon an I/O device associated with system 200. For example, a portion of the output data structure 450 is displayed upon a GUI within a display of the system 200. The speech training data structure 450 may be utilized by the application developer computing system 200 to identify the training data that is most venerable to misinterpretation when a user interacts with the VUI of the application 102. As such, the VUI of the application 102 under development within system 200 may subsequently be adjusted, thereby creating an application 602 with an improved VUI 644, to account for the identified vulnerabilities by the system 200 utilizing output data structure 450 as a map to those vulnerabilities within the VUI of the application 102.

The application 602 with application code 642 and with the improved VUI 644 is transmitted over the network to system 100. Because the application 602 has the improved VUI, the operation of the electronic device 100 evoking the VUI application 602 and/or user experience in interacting with the VUI of the application 602 upon electronic device 100 is improved.

Upon the improvement of application 102, thereby becoming an application 602 that includes the improved VUI, system 100 may receive application 602 directly from system 200 or another like computing device that is owned, maintained, controlled, by the same entity that owns, maintains, controls, etc. computing system 200. Alternatively, the improvement of application 102, thereby becoming an application 602 that includes the improved VUI, system 100 may receive application 602 indirectly from system 200 or another like computing device that is owned, maintained, controlled, by the same entity that owns, maintains, controls, etc. computing system 200 by a $3^{rd}$ party computing system, such as an application retailer computing system. When module 400 is located in computing system 200, module 400 may be evoked by the processor 210 by way of memory 220 to cause the system 200 to carry out the functions highlighted herein.

The user 650 of system 100 may interact with the system 100 via the application 602 VUI 644 by the system 100 receiving speech input 651 from the user, the improved VUI 644 processing the speech input 651, the application code 642 determining a workflow associated with the speech input 651, and the improved VUI 644 presenting audio output 652 according to the workflow to user 650.

Figure 12:
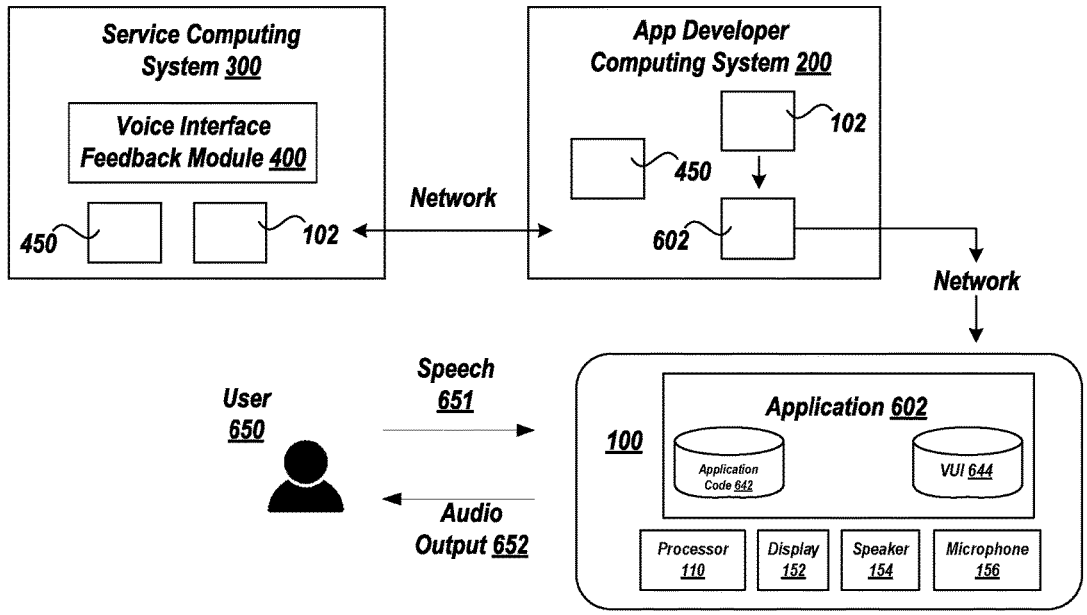
FIG. 12 illustrates an exemplary system wherein VUI feedback module is local to the service computing system, according to one or more embodiments.

FIG. 12 illustrates an exemplary system wherein VUI feedback module 400 is local to the service computing system 300. In these embodiments, the module 400 is local to system 300, or the like computing device, and receives the application 102 or portion of the application 102 (i.e. the corpus 432, or the like) that is under development in system 200. The module 400 analyses the corpus 432 and generates the output data structure 450 and outputs at least a portion of the output data structure 450 to system 200 that is subsequently outputted to the system 200 user upon an I/O device of system 200. For example, a portion of the output data structure 450 is displayed upon a GUI within a display of the system 200. Once received from system 300, the speech training data structure 450 may be utilized by the application developer computing system 200 to identify the training data that is most venerable to misinterpretation when a user interacts with the VUI of the application 102. As such, the VUI of the application 102 under development within system 200 may subsequently be adjusted, thereby creating an application 602 with an improved VUI 644, to account for the identified vulnerabilities by the system 200 utilizing output data structure 450 as a map to those vulnerabilities within the VUI of the application 102.

The application 602 with application code 642 and with the improved VUI 644 is transmitted over the network to system 100. Because the application 602 has the improved VUI 644, the operation of the electronic device 100 evoking the VUI application 602 and/or user experience in interacting with the VUI 644 of the application 602 upon electronic device 100 is improved.

Upon the improvement of application 102, thereby becoming an application 602 that includes the improved VUI 644, system 100 may receive application 602 directly from system 200 or another like computing device that is owned, maintained, controlled, by the same entity that owns, maintains, controls, etc. computing system 200. Alternatively, the improvement of application 102, thereby becoming an application 602 that includes the improved VUI 644, system 100 may receive application 602 indirectly from system 200 or another like computing device that is owned, maintained, controlled, by the same entity that owns, maintains, controls, etc. computing system 200 by a $3^{rd}$ party computing system, such as an application retailer computing system. When module 400 is located in computing system 300, module 400 may be evoked by the processor 310 by way of memory 320 to cause the system 300 to carry out the functions highlighted herein.

The user 650 of system 100 may interact with the system 100 via the application 602 VUI 644 by the system 100 receiving speech input 651 from the user, the improved VUI 644 processing the speech input 651, the application code 642 determining a workflow associated with the speech input 651, and the improved VUI 644 presenting audio output 652 according to the workflow to user 650.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method, comprising:
receiving, with a service computing system from an application developer computing system, voice user interface (VUI) training data of an application that is under development within the application developer computing system;
identifying a training phrase within the VUI training data;
generating, with training phrase synonym analyzer within the application developer computing system, a training phrase synonym data structure comprising a plurality of linked data pairs, each linked data pair comprising the identified training phrase and a unique synonym to the identified training phrase;
receiving, with an acoustic module within the application developer computing system, a selected background noise;
receiving, with a language module within the application developer computing system, a selected speaker voice, selected speaker language, and a selected speaker dialect;
generating an audio output comprising synthesized human speech of each unique synonym of the identified training phrase in the selected speaker voice, selected speaker language, and selected speaker dialect, the audio output further comprising the selected background noise in the background to the synthesized human speech;
audibly presenting the audio output upon a speaker of the application developer computing system and simultaneously capturing the synthesized human speech of each unique synonym of the identified training phrase with a microphone of the application developer computing system;
converting the captured synthesized human speech of each unique synonym of the identified training phrase into text (textualized training phrase synonym) with a selected speech to text framework;
comparing text of each unique synonym of the identified training phrase with the textualized training phrase synonym corresponding thereto;
scoring each textualized training phrase synonym based upon similarity of the textualized training phrase synonym to the text of the unique synonym corresponding thereto;
generating an output training data score data structure comprising the score of each textualized training phrase synonym, the text of the training phrase, the text of each textualized training phrase synonym, the selected background noise, the selected speaker voice, the selected speaker language, and the selected speaker dialect, the output training data score data structure ranking those training phrase synonyms that are most misunderstood by the selected speech to text framework to those training phrase synonyms that are accurately understood by the selected speech to text framework; and
sending the output training data score data structure to the application developer computing system.

2. The method of claim 1, further comprising:
displaying the output training data score data structure within a graphical user interface (GUI) upon a display of the application developer computing system;
modifying the VUI of the application (original VUI) to create a modified VUI of the application within the application developer computing system based upon the output training data score data structure; and
sending the application with the modified VUI to an application user computing system, wherein the modified VUI, when called by the application user computing system, has increased accurately understood speech input relative to the original VUI, when called by the application user computing system.

3. The method of claim 1, wherein comparing text of each unique synonym of the identified training phrase with the textualized training phrase synonym corresponding thereto comprises a character comparison between the text of each unique synonym with the textualized training phrase synonym corresponding thereto.

4. The method of claim 1, wherein comparing text of each unique synonym of the identified training phrase with the textualized training phrase synonym corresponding thereto comprises a natural language comparison between the text of each unique synonym with the textualized training phrase synonym corresponding thereto.

5. The method of claim 1, wherein the speaker converts an electrical signal of the audio output to audio of the audio output and wherein the microphone converts the audio of the audio output to an electrical signal of the audio output.

6. A computer program product comprising a first computer readable storage medium having first program instructions embodied therewith, the first program instructions readable by a service computing system to cause the service computing system to:
- receive, from an application developer computing system, voice user interface (VUI) training data of an application that is under development within the application developer computing system;
- identify a training phrase within the VUI training data;
- generate a training phrase synonym data structure comprising a plurality of linked data pairs, each linked data pair comprising the identified training phrase and a unique synonym to the identified training phrase;
- receive a selected background noise;
- receive a selected speaker voice, selected speaker language, and a selected speaker dialect;
    - generate an audio output comprising synthesized human speech of each unique synonym of the identified training phrase in the selected speaker voice, selected speaker language, and selected speaker dialect, the audio output further comprising the selected background noise in the background to the synthesized human speech;
- audibly present the audio output upon a speaker of the application developer computing system and simultaneously capture the synthesized human speech of each unique synonym of the identified training phrase with a microphone of the application developer computing system;
- convert the captured synthesized human speech of each unique synonym of the identified training phrase into text (textualized training phrase synonym) with a selected speech to text framework;
- compare text of each unique synonym of the identified training phrase with the textualized training phrase synonym corresponding thereto;
- score each textualized training phrase synonym based upon similarity of the textualized training phrase synonym to the text of the unique synonym corresponding thereto;
- generate an output training data score data structure comprising the score of the textualized training phrase synonym, the text of the training phrase, the text of each textualized training phrase synonym, the selected background noise, the selected speaker voice, the selected speaker language, and the selected speaker dialect, the output training data score data structure ranking those training phrase synonyms that are most misunderstood by the selected speech to text framework to those training phrase synonyms that are accurately understood by the selected speech to text framework; and
- send the output training data score data structure to the application developer computing system.

7. The computer program product of claim 6, further comprising a second computer readable storage medium having second program instructions embodied therewith, the second program instructions readable by the application developer computing system to cause the application developer computing system to:
- display the output training data score data structure within a graphical user interface (GUI) upon a display of the application developer computing system;
- modify the VUI of the application (original VUI) to create a modified VUI of the application within the application developer computing system based upon the output training data score data structure; and
- send the application with the modified VUI to an application user computing system, wherein the modified VUI, when called by the application user computing system, has increased accurately understood speech input relative to the original VUI, when called by the application user computing system.

8. The computer program product of claim 6, wherein the comparison of each unique synonym of the identified training phrase with the textualized training phrase synonym corresponding thereto comprises a character comparison between the text of each unique synonym with the textualized training phrase synonym corresponding thereto.

9. The computer program product of claim 6, wherein the comparison of each unique synonym of the identified training phrase with the textualized training phrase synonym corresponding thereto comprises a natural language comparison between the text of each unique synonym with the textualized training phrase synonym corresponding thereto.

10. The computer program product of claim 6, wherein the speaker converts an electrical signal of the audio output to audio of the audio output and wherein the microphone converts the audio of the audio output to an electrical signal of the audio output.

11. A service computing system comprising a first processor and a first memory, the first memory comprising first program instructions embodied therewith that are readable by the first processor to cause the first processor to:
- receive, from an application developer computing system, voice user interface (VUI) training data of an application that is under development within the application developer computing system;
- identify a training phrase within the VUI training data;
- generate a training phrase synonym data structure comprising a plurality of linked data pairs, each linked data pair comprising the identified training phrase and a unique synonym to the identified training phrase;
- receive a selected background noise;
- receive a selected speaker voice, selected speaker language, and a selected speaker dialect;
- generate an audio output comprising synthesized human speech of each unique synonym of the identified training phrase in the selected speaker voice, selected speaker language, and selected speaker dialect, the audio output further comprising the selected background noise in the background to the synthesized human speech;
- audibly present the audio output upon a speaker of the application developer computing system and simultaneously capture the synthesized human speech of each unique synonym of the identified training phrase with a microphone of the application developer computing system;

convert the captured synthesized human speech of each unique synonym of the identified training phrase into text (textualized training phrase synonym) with a selected speech to text framework;

compare text of each unique synonym of the identified training phrase with the textualized training phrase synonym corresponding thereto score each textualized training phrase synonym based upon similarity of the textualized training phrase synonym to the text of the unique synonym corresponding thereto;

generate an output training data score data structure comprising the score of the textualized training phrase synonym, the text of the training phrase, the text of each textualized training phrase synonym, the selected background noise, the selected speaker voice, the selected speaker language, and the selected speaker dialect, the output training data score data structure ranking those training phrase synonyms that are most misunderstood by the selected speech to text framework to those training phrase synonyms that are accurately understood by the selected speech to text framework; and send the output training data score data structure to the application developer computing system.

12. The service computing system of claim 11, further comprising a second processor within the application developer computing system and a second memory within the application developer computing system, the second memory comprising second program instructions embodied therewith that are readable by the second processor to cause the second processor to:

display the output training data score data structure within a graphical user interface (GUI) upon a display of the application developer computing system;

modify the VUI of the application (original VUI) to create a modified VUI of the application within the application developer computing system based upon the output training data score data structure; and send the application with the modified VUI to an application user computing system, wherein the modified VUI, when called by the application user computing system, has increased accurately understood speech input relative to the original VUI, when called by the application user computing system.

13. The service computing system of claim 11, wherein the comparison of each unique synonym of the identified training phrase with the textualized training phrase synonym corresponding thereto comprises a character comparison between the text of each unique synonym with the textualized training phrase synonym corresponding thereto.

14. The service computing system of claim 11, wherein the comparison of each unique synonym of the identified training phrase with the textualized training phrase synonym corresponding thereto comprises a natural language comparison between the text of each unique synonym with the textualized training phrase synonym corresponding thereto.

* * * * *